(12) United States Patent
Mueller

(10) Patent No.: US 9,298,556 B2
(45) Date of Patent: Mar. 29, 2016

(54) GRAPHICS PROCESSING WATCHDOG ACTIVE RESET

(71) Applicant: Nintendo Co., Ltd., Kyoto (JP)

(72) Inventor: Carl Mueller, Redmond, WA (US)

(73) Assignee: NINTENDO CO., LTD., Kyoto (JP)

(*) Notice: Subject to any disclaimer, the term of this patent is extended or adjusted under 35 U.S.C. 154(b) by 215 days.

(21) Appl. No.: 13/869,927

(22) Filed: Apr. 24, 2013

(65) Prior Publication Data

US 2014/0325274 A1    Oct. 30, 2014

(51) Int. Cl.
| | |
|---|---|
| G06F 11/00 | (2006.01) |
| G06F 11/14 | (2006.01) |
| G06F 11/20 | (2006.01) |
| G06F 11/07 | (2006.01) |

(52) U.S. Cl.
CPC ........ *G06F 11/1441* (2013.01); *G06F 11/0706* (2013.01); *G06F 11/20* (2013.01)

(58) Field of Classification Search
CPC ...................................................... G06F 11/20
See application file for complete search history.

(56) References Cited

U.S. PATENT DOCUMENTS

| | | | | |
|---|---|---|---|---|
| 5,513,319 | A  * | 4/1996 | Finch et al. ..................... | 714/55 |
| 6,948,092 | B2 * | 9/2005 | Kondo et al. .................... | 714/12 |
| 7,627,787 | B1 * | 12/2009 | Johnson et al. ................. | 714/43 |
| 7,702,955 | B2 * | 4/2010 | de Almeida et al. ............ | 714/10 |
| 8,717,370 | B2 * | 5/2014 | Chen ................... | G06F 11/2268 345/426 |
| 8,933,934 | B1 * | 1/2015 | Hill .......................... | G06T 1/20 345/426 |
| 2011/0053649 | A1 * | 3/2011 | Wilson ......................... | 455/566 |

* cited by examiner

*Primary Examiner* — Amine Riad
(74) *Attorney, Agent, or Firm* — Nixon & Vanderhye P.C.

(57) ABSTRACT

An advantageous watchdog function deduces faulty operation of a graphics processing unit from historical-indicating parameters while also accommodating more active testing performed by an application. When a GPU fault is detected, the example non-limiting technology rapidly resets the GPU during an interframe time so the GPU is ready to process new frame instructions or display lists and avoids missing or skipping further frames.

16 Claims, 6 Drawing Sheets

Normal system drawing operation:

GRAPHICS PROCESSING WATCHDOG ACTIVE RESET

FIELD

This technology relates to hardware monitoring and management, and more particularly to providing a watchdog function that actively resets graphics processor components when faults are detected.

BACKGROUND AND SUMMARY

Many modern consumer electronic devices are actually miniaturized computers. The hand-held smart phone, music player, tablet, video game system or other consumer electronic device that you may be carrying in your pocket or purse has more computing power than bygone era so-called "mainframe" computers that occupied entire rooms. The trend of packing even more computing power into smaller and smaller packages is likely to continue as even more electronic components can be further miniaturized and placed onto the same integrated circuit.

In response to user demand, many computing devices now have advanced computer graphics generation and display capabilities. Such graphics capabilities permit the computing device to generate complex images in real time. From video streaming to video games, from geographical mapping to photography, graphics capabilities have become essential.

While it is theoretically possible for a general purpose central processing unit ("CPU") to generate complex graphics given enough time, real time graphics imposes timeliness constraints that have caused system designers to include additional graphics processing units ("GPUs") specialized for graphics functions. Such GPU's typically include specialized hardware designed specifically to very rapidly perform complex computationally-intensive operations required to generate graphics images.

FIG. 1 which shows a typical system architecture including a CPU 10 and a GPU 11B. For example, a typical GPU 11B may include a transformation and lighting unit, shading hardware, texture mapping hardware, pixel processing hardware and much more. Some systems may include several CPU's 10 and/or several GPU's 20.

To control GPU 11B, the CPU 10 typically issues or writes a "display list" to the GPU. The display list is typically a list or series of graphics commands or instructions that tells the GPU 11B what to do. This is a little like the front office of a company issuing instructions to the manufacturing department asking for a certain number of widgets of a particular type to be manufactured. In this case, the GPU 11B is manufacturing a single image frame for display as specified by the display list. The CPU 10 can deposit working materials (data) into shared memory 11e and use the display list to tell the GPU 11B where to find them and what to do with them. The GPU 11B will then dutifully do what the CPU 10 tells it to do by following those instructions to the letter and manufacture a frame of video based on the instructions.

In the world of computer graphics, the GPU 11B is typically held to a very strict time schedule called the frame or update rate. Generally speaking, in interactive computer graphics, the display must be updated quickly enough so that the human eye does not see any delays but instead interpolates between frames to create the illusion of continuous motion. If the GPU redraws or renders new images that quickly, (i.e., 30 or 60 times every second), then the user sees no discontinuities and the illusion of continuous animated motion is preserved.

In part because of the relatively loose coupling between CPU 10 and GPU 11B, it is sometimes possible for the GPU to fall behind or otherwise be unable to maintain its tight schedule. In particular, suppose CPU 10 sends the GPU 11B bad or corrupt display list instructions. The GPU 11B may try to diligently do precisely what the CPU 10 has instructed the GPU to do, but if the instructions are bad, the GPU can get confused or even completely stuck. Often, because the GPU 11B is optimized to do precisely what it is instructed to do very quickly, it has no capability to deviate from the instructions, seek clarification from the CPU 10 or otherwise compensate for bad instructions.

This would be like the front office asking the manufacturing department to make something that is impossible to make or which requires parts that are not on hand. In a corporate environment, manufacturing could report back to the front office that the instructions cannot be followed and instead request clarification and/or new instructions. However, in the computing world, it can sometimes happen that a GPU 11B given poor instructions can simply lock up or "hang." Meanwhile, if the CPU 10 assumes the GPU 11B is performing as requested while the GPU is actually stumped and has gotten stuck, the CPU needs to do something to help the GPU out of its impossible situation.

As a general matter, it is known to automatically reset a GPU when a fault is detected. For example, in certain Nintendo video game systems such as the GameCube, some developers in the past wrote application programs that would check for proper GPU activity and initiate a GPU hardware reset if a fault was detected. However, since such techniques were generally left up to the developer; there was no automatic way to reset the GPU if the application was poorly designed or the application did not take GPU fault situations into account.

It is known to use a so-called "watchdog" circuit or function to monitor and remedy system faults. For example, suppose a circuit such as a microprocessor is programmed or designed to periodically emit a signal. A so-called "watchdog timer" can be used to monitor the signal and determine whether it is present. If the "watchdog timer" does not see the periodic signal when it is supposed to be produced, the "watchdog timer" can take an appropriate action (e.g., including initiating a hardware reset of the CPU or other circuit).

Thus, while much more has been done in the past to monitor hardware for faults, further improvements are desirable. In particular, it would be desirable to accommodate both fault testing performed by a well or conservatively-designed application while also providing a fallback operation that does not depend on such testing performed by the application while nevertheless being compatible with such application testing.

The example, non-limiting technology herein provides an advantageous watchdog function that deduces faulty operation of a graphics processing unit from historical-indicating parameters while also accommodating more active testing performed by an application. When a GPU fault is detected, the example non-limiting technology rapidly resets the GPU during an interframe time so the GPU is ready to process new frame instructions or display lists and avoiding missing or skipping further frames.

BRIEF DESCRIPTION OF THE DRAWINGS

These and other features and advantages will be better and more readily understood by referring to the following detailed description of example non-limiting embodiments in connection with the drawings, of which:

FIGS. 4A, 4B-1, 4B-2 and 4C are additional flowcharts; and

DETAILED DESCRIPTION

Figure 1:
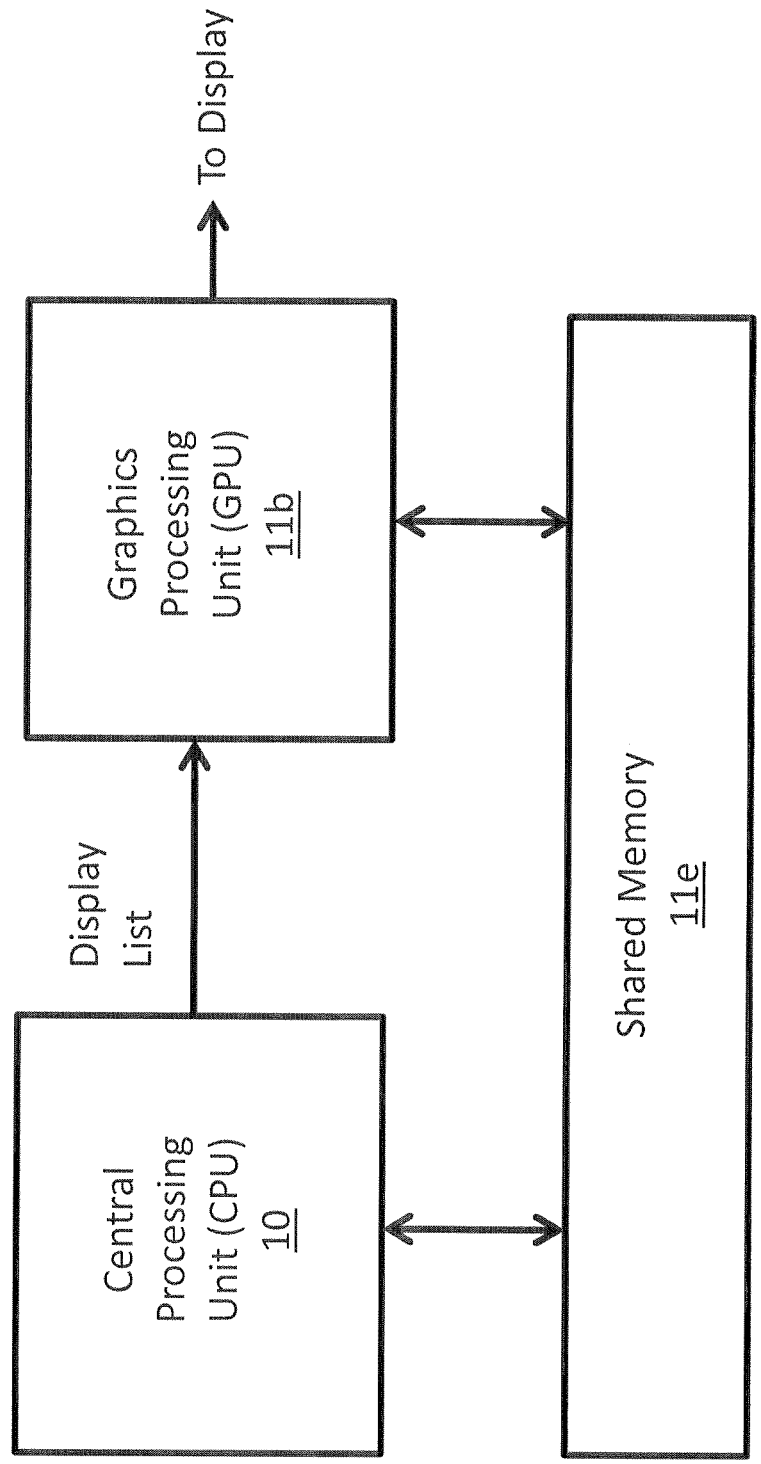
FIG. 1 shows an example prior art system.
Figure 2:
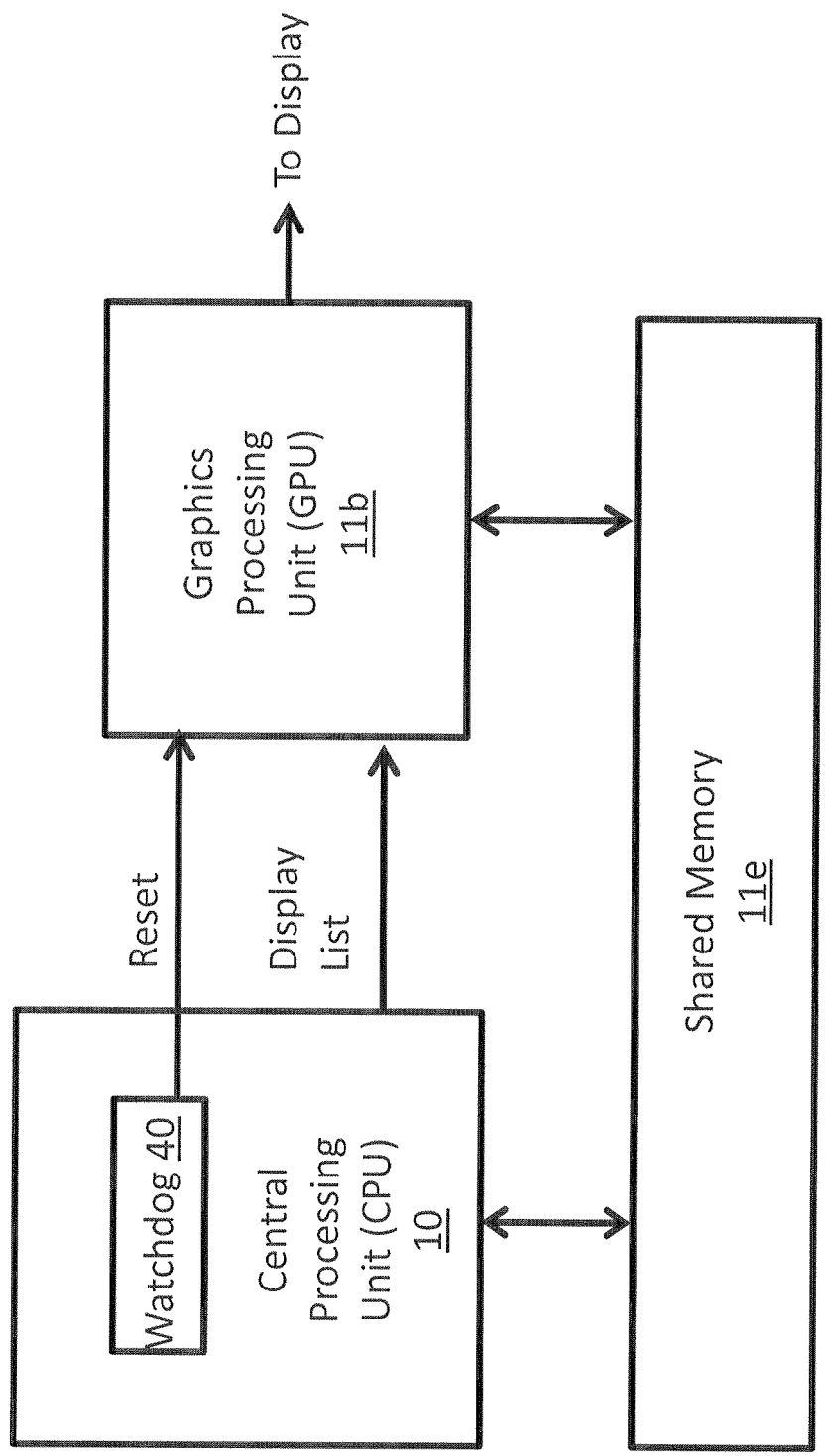
FIG. 2 shows an example non-limiting embodiment of the technology provided herein.

FIG. 2 shows an example non-limiting embodiment system modified from FIG. 1 to include a watchdog function 40 capable of issuing a reset command to GPU 11B when the watchdog function detects that the GPU may have malfunctioned, faulted or gotten stuck. In the example non-limiting implementation, the watchdog function 40 is performed by software (instructions stored in non-transitory memory 30) executing on CPU 10, but in other implementations that watchdog function could be performed by dedicated hardware or by a combination of dedicated hardware and software running on the CPU.

In the example non-limiting implementation, watchdog function 40 deduces when GPU 30 is not operating properly and conditionally sends the GPU a reset signal that causes the GPU to reinitialize its operating state. In one example non-limiting implementation, such a reset signal can initiate a hardware reset of the GPU 11B to cause the GPU to begin operating from a known initial state. In the example non-limiting implementation, the watchdog function 40 generates such a GPU reset signal at a strategic timing so that (a) the GPU is finished resetting and ready to receive and process new instructions by the time the CPU 10 will send the GPU instructions to render the next frame and (b) the GPU is not interrupted from performing any current frame processing but instead is given sufficient time to complete whatever frame processing it is engaged in (in case the GPU is not in fact failed or locked up) and so it does not fault again before the CPU needs it to operate properly.

Thus, if GPU 11B hangs for example in response to receipt of a corrupt command list, the watchdog function 40 running on CPU 10 detects when the GPU is hung and performs a hardware reset at an appropriate interframe time.

The watchdog function 40 can use various techniques to determine when the GPU 11B is in trouble. For example, in one example non-limiting implementation (see FIG. 3), at different places in application code running on the CPU where the CPU might be waiting for the GPU to complete a task and report completion, there is a test for a timeout (decision block 104). If the timeout is exceeded ("yes" exit to decision block 104), the watchdog function 40 determines that the GPU 11B is likely no longer functioning properly and makes a note of this by setting a flag (block 106). However, in the example non-limiting implementation, the watchdog function 40 does not immediately reset the GPU but instead waits for a next end-of-frame time before initiating a reset. It may be undesirable to perform a reset in the middle of drawing because at that point in time the CPU 10 may not be prepared to issue the GPU 11B new instructions and the GPU could have other faults while waiting for the next frame generation time to begin.

Rather, in the example non-limiting implementation, additional hang detection and reset takes place at the end of one frame time and the beginning of the next frame time. In particular, in one example non-limiting implementation, the reset and hang detection may be performed at a certain point in the processing referred to as a "swap buffers" moment (decision block 108). This time may be called "swap buffers" time because in a double-buffered graphics system, the GPU 11B may render into one buffer while the contents of a second buffer are being displayed. Then, when the next frame is to be displayed, the GPU 11B may "swap buffers" and cause the display to receive the contents of the buffer into which the most recent frame has been rendered and begin rendering the next frame into the buffer last used to supply the display. This "swap buffers" time is thus the time when all generation of the current frame is supposed to be complete (i.e., there is no more time left in the frame generation schedule to permit further rendering) and it is instead time to send the newly generated image to the display. If that "swap buffers" time has not yet arrived, watchdog function 40 returns to watch for additional timeouts (block 104).

Once the "swap buffers" time arrives ("yes" exit to decision block 108), the watchdog function checks whether there was a hang detected previously in the frame (e.g., by checking the state of the flag) (block 110). However, since there may be applications that have not kept close tabs on what the GPU has been doing during the frame time (and thus may not have ever set the flag even though the GPU has faulted), the GPU could be locked up and the application will not have detected this through its own monitoring or feedback. The watchdog function 40 in the example non-limiting implementation performs an additional explicit check (block 110) as a failsafe just in case the application is not performing such checks.

In the example non-limiting implementation, it may be undesirable to require an additional feedback or other test at this "swap buffers" stage because this would add additional wait time or delay. It may instead be desirable to reset the GPU 11B as quickly as possible (assuming it is necessary to reset the GPU) in order to get it ready for processing the next frame. Accordingly, in one example non-limiting implementation, the watchdog function 40 looks at various parameters that are already available (e.g., stored within the CPU 10 and/or shared memory 11e) that are indicative of processing that was recently performed by the CPU. Watchdog function 40 uses these history parameters to deduce whether the GPU 11B is hung or locked and needs to be reset.

In one example non-limiting implementation, such parameters can comprise for example the amount of time that has passed since the last time the image was changed over. The watchdog timer can compare this time period to see if it exceeds a certain threshold. If too much time has passed since the GPU 11b performed a "swap buffers", the watchdog function 40 can conclude that the GPU has skipped at least one frame and faulted, and may reset the GPU to get it operating properly again.

Alternatively or in addition, the watchdog function 40 may look at the number of times the CPU 10 requested the GPU to change the image over (i.e., asked the GPU to do a swap buffer operation) compared to the number of times the GPU actually completed the "swap buffer" operation.

In one example non-limiting processing, if (1) a long time has passed since the last time a swap buffer operation was performed and (2) the GPU 11B has fallen behind in the number of swap buffer operations it has completed relative to the number of such operations the CPU 10 requested and (3) the system is not in a starting up condition, then watchdog function 40 deduces that the GPU 11B is hung (faulted) and calls code that will perform a hardware reset on the GPU (block 114). Because this testing and reset processing is performed at the end of a frame, it will not disrupt any drawing operation in process.

Figure 3:
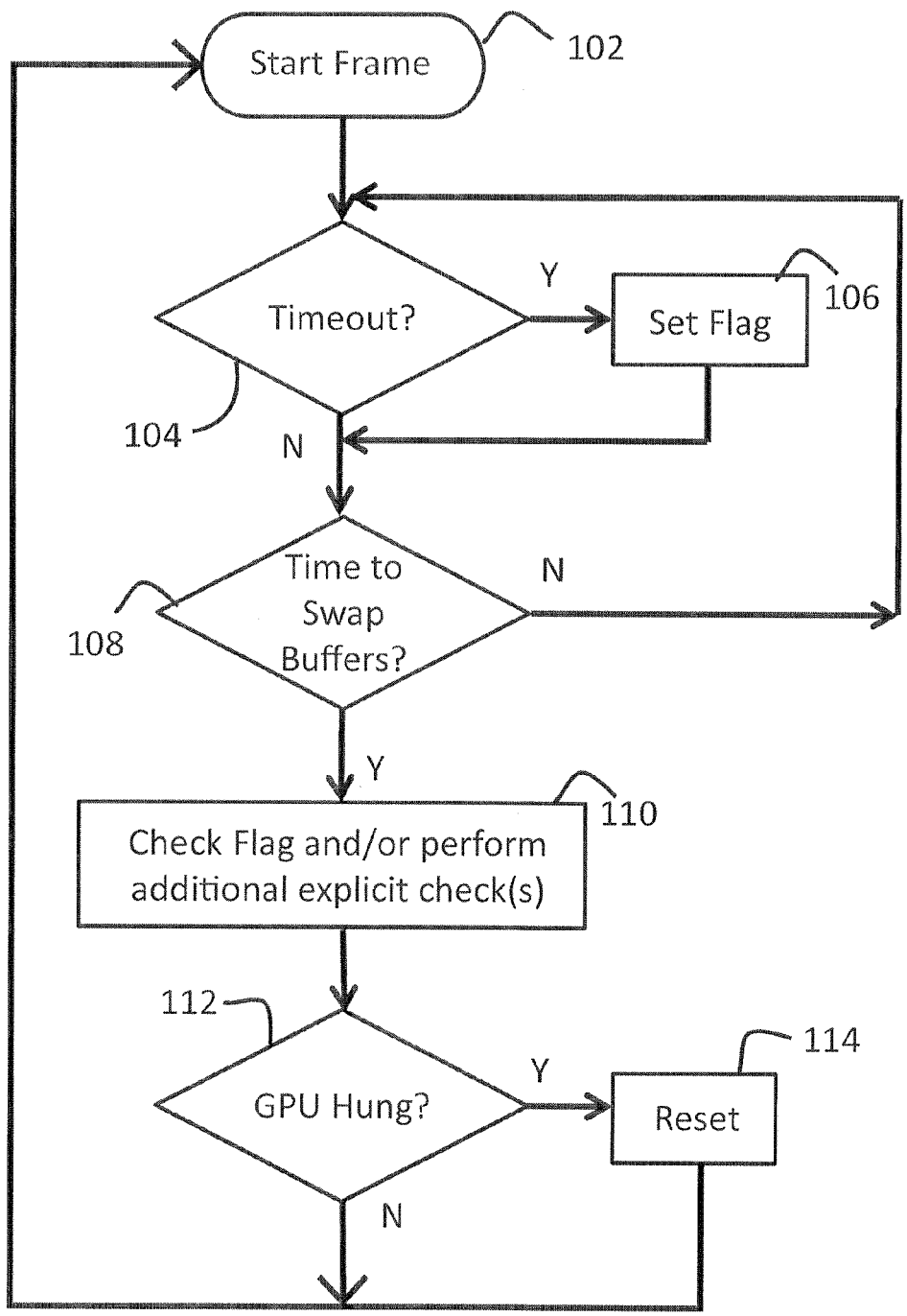
FIG. 3 is a flowchart of example non-limiting program controlled steps.

The particular dynamic operation of the FIG. 3 flowchart may depend in some cases on the application program. For example, some application programs might ask the GPU 11B to do something and then check to see if the GPU has completed the task or is otherwise active (e.g., by requiring the GPU to generate an interrupt, callback or the like). However, in some example systems, such interrupts or callbacks are not required but rather are left to the discretion of the application programmer. Thus, some application programs running on CPU 10 may be more active than others in keeping close track of what the GPU 11B is doing.

If an application just gives tasks to the GPU and does not keep close track, then the testing of blocks 110, 112 may be performed in standard graphics library calls that must be done each time the system displays a new image (e.g., a "swap buffers" command). Furthermore, in one example non-limiting implementation, every time the GPU 11B performs a buffer switch, it updates a counter and writes the counter value into shared memory 30. This counter value thus indicates how many swaps the GPU 11B has performed. The watchdog function 40 (which has access to a real time clock) can check this value written to memory to determine when the GPU 11B last updated the value—thereby detecting whether the GPU has fallen behind in delivering new image frames. Such a check can look at the time a last known image swap or flip occurred. In addition, in one example non-limiting implementation, CPU 10 keeps track of how many times it has told the GPU 11B to swap, and the GPU 11B writes a value to memory 30 stating how many times it has actually performed the image swap. The watchdog function 40 can compare these two values to determine how many requested image swaps are outstanding and thereby deduce whether the GPU 11B has fallen behind.

Thus, the example non-limiting technology herein can perform a GPU 11B reset at an appropriate time in response to an application running on CPU 10 setting a flag or other indicator that the GPU 11B has not reported back on a task the CPU assigned to the GPU. This relieves the application from having to generate the reset itself or keeping track of the appropriate time to perform the reset. If the application sets a reset flag, then the system will automatically perform a GPU reset at an appropriate time without any further action on the part of the application program and the GPU 11B will be ready for further instructions at the beginning of the next frame time when the application expects to be able to send the GPU a new display list for the next image.

However, in the example non-limiting implementation, even if the application is not written to closely track the status and operation of GPU 11B, the runtime library and/or the operating system can automatically detect a GPU fault and reset GPU 11B at the appropriate time before the beginning of next frame processing. Thus, in either case, as soon as watchdog function 40 detects that GPU 11B has faulted, then at the end of that same frame, a reset is performed.

In one example non-limiting implementation, to perform a reset of GPU 11B the watchdog function 40 running on CPU 10 writes to a special control register in the GPU, thereby causing the GPU to perform a hardware reset. The watchdog function 40 may also write to other appropriate GPU 11B registers to appropriately initialize the GPU to start up again. The GPU reset is performed during an interframe time and is completed very rapidly (e.g., in a few milliseconds)—before the beginning of the next frame processing to avoid the need to drop any additional frames.

Example More Detailed Flowcharts

Figure 4A:
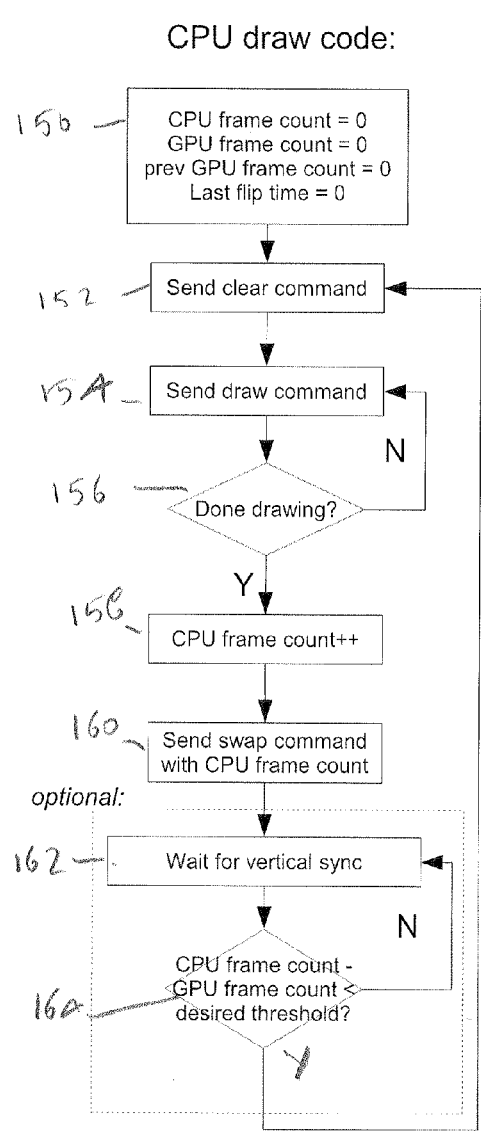
Figures 1, 4B:
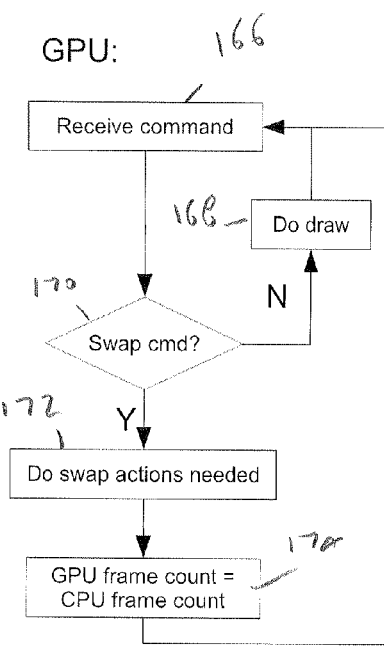
Figures 2, 4B:
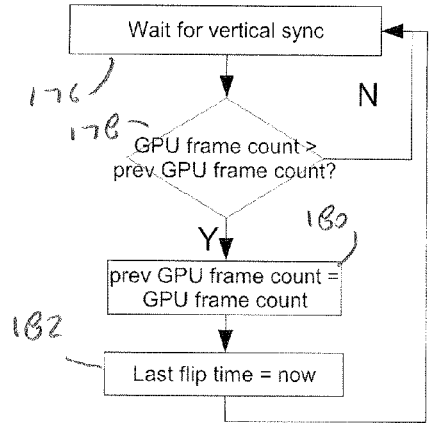
Figure 4C:
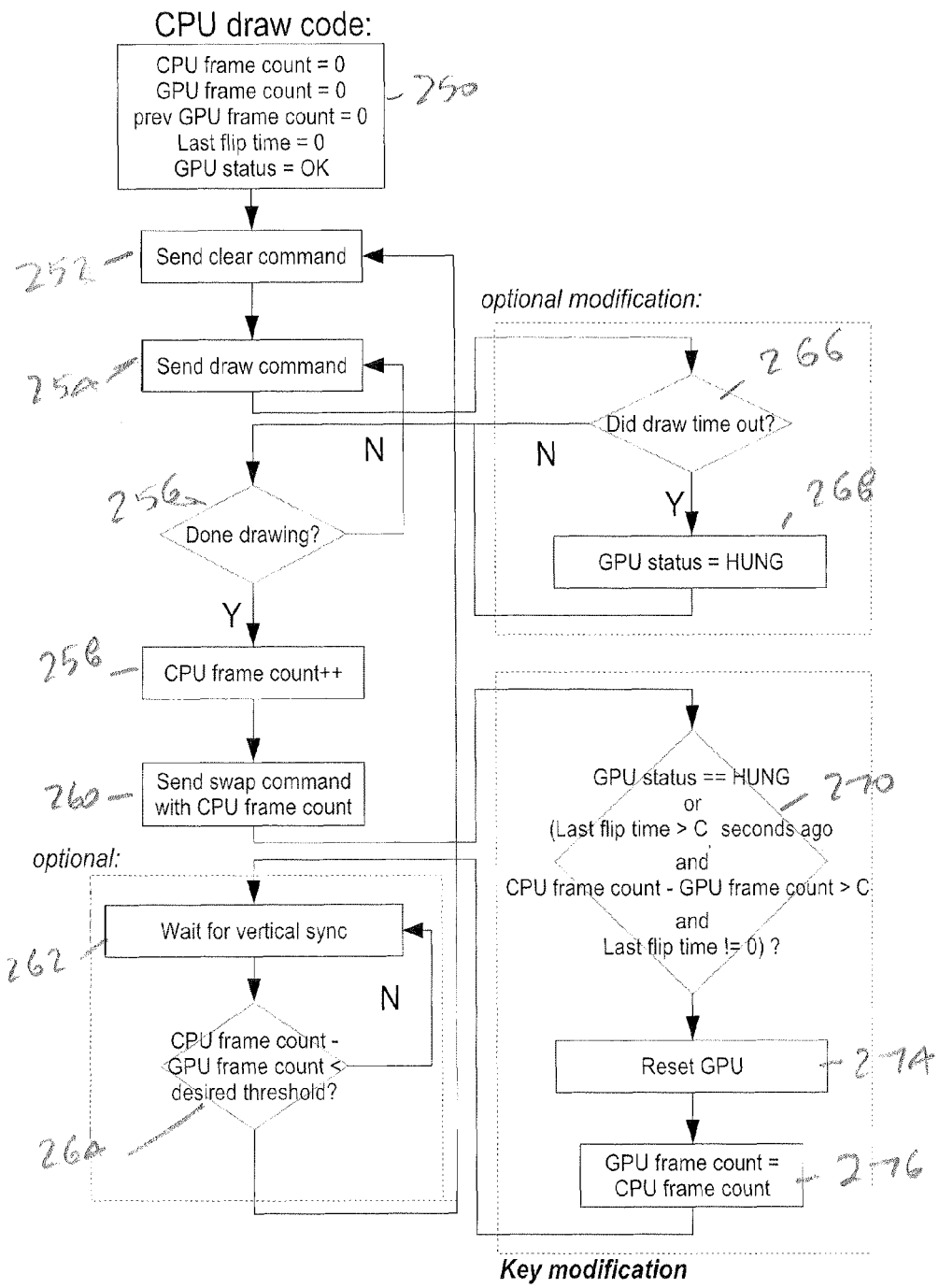

FIGS. 4A, 4B-1, 4B-2 and 4C show example more detailed flowcharts of program control steps. FIGS. 4A, 4B-2, 4B-2 show prior art CPU and GPU processing, and FIG. 4C shows modifications to the CPU processing to perform the example non-limiting technology herein.

As shown in FIG. 4A, the typical CPU 10 draw code begins by initializing certain counters (150), sending GPU 11$b$ a clear command (152) and then sending the GPU a draw command (154). FIG. 4B-1 shows GPU 11$b$ processing upon receiving a command (166) which determines whether the command is a "swap" (in this case it is not, "N" exit to decision block 170) and then performs the requested draw (168) and waits for the next command. In FIG. 4A, CPU 10 determines whether it has an further drawing commands to send (decision block 156). If drawing is finished, the CPU 10 increments its frame count (158) and sends a swap command with the CPU frame count to GPU 11$b$ (160). In response to receipt of this swap command from CPU 10, GPU 11$b$ decodes the command (170), performs necessary swap actions (172) and then sets the GPU frame count=CPU frame count (174). Flowcharts 4A and 4B-2 then show two different alternatives.

In one alternative, CPU 10 waits for vertical sync (block 162) before comparing the CPU frame count to the GPU frame count to determine whether the difference is less than a desired threshold (block 164). If the difference is less than the threshold, then CPU 10 may send a clear command (152) and begin the process again. If the difference exceeds the desired threshold ("N" exit to decision block 164), the CPU may again wait for a vertical sync.

In another alternative (FIG. 4B-2), the CPU 10 is interrupted by receipt of a vertical sync timing signal (block 176). If then determines as part of an interrupt handler routine whether the GPU frame count>the previous GPU frame count (178). If not, the CPU interrupt handler may return and wait for the next vertical sync (block 176). If GPU frame count>the previous GPU frame count ("Y" exit to decision block 178), then the CPU 10 sets the previous GPU frame count=GPU frame count (block 180) and sets a flag or indicator indicating "last flip time=now" (182).

FIG. 4C modifies the program control arrangement of FIGS. 4A, 4B-1, 4B-2 to provide a "GPU Status" flag block 250). Additionally, after the CPU 10 sends GPU 11$b$ a drawing command (block 254), the CPU may optionally determine whether the drawing timed out (block 266). If so, the CPU changes the GPU Status flag to "HUNG" or "FAULT" (block 268). Additionally, after sending GPU 11$b$ a swap command with CPU frame count (block 260), the CPU performs the following test:

---
GPU Status = = HUNG
OR
(Last flip time > C seconds ago
AND
CPU Frame count − GPU frame count > C
AND
Last flip time != 0)

---

In other words, (1) is the GPU Status "HUNG" OR (2) did last flip time occur more than a predetermined set time ago AND the CPU frame count is greater than the GPU frame count by a certain set threshold AND the last flip time is not equal to zero? If the above is TRUE, then the CPU 10 resets GPU 11$b$ (274) and resets the GPU frame count to equal the CPU frame count (276).

Example More Detailed Hardware Block Diagram

Figure 5:
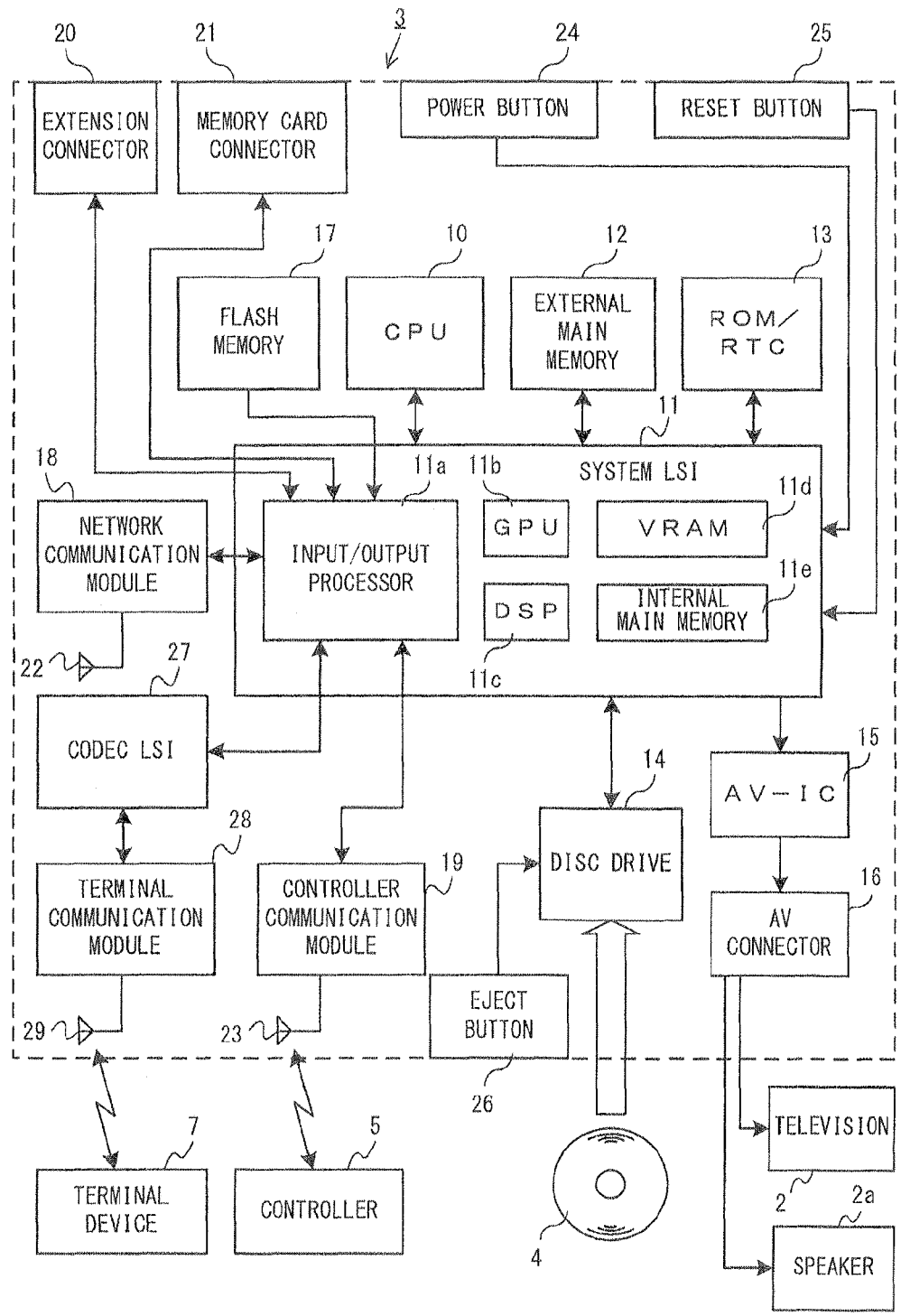
FIG. 5 is a block diagram of an example system with which the system of FIG. 2 can be used.

FIG. 5 is a block diagram illustrating an internal configuration of an example non-limiting computing device 3 with which the above-described arrangement can be advantageously used. Computing device 3 can provide any desired form factor including but not limited to a handheld computing device, a laptop computer, a home video game system, a smart phone, a tablet, a cloud computing device, an embedded processing device or any other sort of device or other appliance.

The computing device 3 includes CPU (Central Processing Unit) 10, a system LSI 11, external main memory 12, a ROM/RTC (real time clock) 13, a disc drive 14, and an AV-IC 15. The RTC can be used by watchdog function 40 running on CPU 10 to time the GPU 11b operations the watchdog function is monitoring.

The CPU 10 performs software controlled processes by executing application programs stored, for example, on the optical disc 4 or in external main memory 12 or flash memory 17. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device(s), and the like. The internal configuration of the system LSI 11 will be described below.

The external main memory 12 is of a volatile type and stores an application program such as a game program, a word processing program, a browser, or any other application read from the optical disc 4 and/or from flash memory 17, and various data. The external main memory 12 is used as a work area and a buffer area for the CPU 10. The ROM/RTC 13 includes a ROM (a so-called boot ROM) incorporating a boot program including an operating system program for the computing device 3, and a clock circuit (RTC: Real Time Clock) for counting time. The disc drive 14 reads program data, image data, and the like from the optical disc 4, and writes the read data into internal main memory 11e or the external main memory 12.

The system LSI 11 includes an input/output processor (I/O processor) 11a, GPU (Graphics Processor Unit) 11b, a DSP (Digital Signal Processor) 11c, VRAM (Video RAM) 11d, and the shared main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) to be used by the GPU 11b to execute the graphics commands. When images are generated, the GPU 11b generates image data using data stored in the VRAM 11d. Note that in the present example embodiment, the computing device 3 generates both images to be displayed on the display 2 and images to be displayed on the terminal device 7. In the example non-limiting embodiment, the GPU 11b includes one or more registers, pins or other input mechanisms that constitute a hardware reset circuit. When CPU 10 writes signals to such registers, pins or other inputs, the GPU 11b resets itself and reinitializes to a known starting state. Such resetting can cause the GPU 11b to escape from a faulted or "hung" condition and begin operating normally again.

The DSP 11c, functioning as an audio processor, generates sound data using sound data and sound waveform (e.g., tone quality) data stored in one or both of the internal main memory 11e and the external main memory 12. In one example embodiment, sounds to be generated are classified into two types, one being outputted from the speaker of the display 2, the other being outputted from speakers of the terminal device 7. Among the images and sounds generated by the computing device 3 as described above, both image data and sound data to be outputted from the display 2 are read out by the AV-IC 15. The AV-IC 15 outputs the read-out image data to the display or other display 2 via an AV connector 16, and outputs the read-out sound data to the speakers 2a provided in the display 2. Thus, images are displayed on the display 2, and sounds are outputted from the speakers 2a. Note that the computing device 3 and the display 2 may be connected in any manner, and a control command for controlling the display 2 may be transmitted to the display 2 by the computing device 3 in a wired or wireless manner. For example, an HDMI cable, which supports the HDMI (high-definition multimedia interface) standard, may be used. The HDMI standard allows a device to control another device connected thereto on the basis of a function called CEC (consumer electronics control). Accordingly, in the case where the HDMI cable is used so that the computing device 3 can control the display 2, the computing device 3 can turn on the display 2 or switch between inputs to the display 2 at appropriate times.

Among the images and sounds generated by the computing device 3, both image data and sound data to be outputted by the terminal device 7 are transmitted to the terminal device 7 by the input/output processor 11a, etc.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and a codec LSI 27. Furthermore, an antenna 22 is connected to the network communication module 18. An antenna 23 is connected to the controller communication module 19. The codec LSI 27 is connected to a terminal communication module 28, and an antenna 29 is connected to the terminal communication module 28.

The computing device 3 is capable of connecting to a network such as the Internet to communicate with an external information processing apparatus (e.g., another computing device or a server). Specifically, the input/output processor 11a can be connected to a network such as the Internet via the network communication module 18 and the antenna 22 to communicate with other information processing apparatuses connected to the network. The input/output processor 11a regularly accesses the flash memory 17, and detects the presence or absence of any data to be transmitted to the network, and when detected, transmits the data to the network via the network communication module 18 and the antenna 22. Further, the input/output processor 11a receives data transmitted from the external information processing apparatuses and data downloaded from a download server via the network, the antenna 22 and the network communication module 18, and stores the received data in the flash memory 17. The CPU 10 executes a program so as to read data stored in the flash memory 17 and use the data, as appropriate, in the program. The flash memory 17 may store save data (e.g., result data or unfinished data) of an application using the computing device 3 in addition to data exchanged between the computing device 3 and the external information processing apparatuses. Moreover, the flash memory 17 may have a program stored therein.

Furthermore, the computing device 3 is capable of receiving operation data from the controller 5. Specifically, the input/output processor 11a receives operation data transmitted from the controller 5 via the antenna 23 and the controller communication module 19, and stores it (temporarily) in a buffer area of the internal main memory 11e or the external main memory 12.

Furthermore, the computing device 3 is capable of exchanging data, for images, sound, etc., with the terminal device 7. When transmitting images to the terminal device 7 for display, the input/output processor 11a outputs image data generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted by the terminal communication module 28 to the terminal device 7 via the antenna 29. In the present example embodiment, the image data transmitted from the computing device 3 to the terminal device 7 is image data used in an application, and the user experience can be adversely influenced if there is a delay in the images displayed. Therefore, the system avoids delay in transmitting image data from the computing device 3 to the terminal device 7. Therefore, in the present example embodiment, the codec LSI 27 compresses image data using a compression technique with high efficiency such as the H.264 standard, for example. Other compression techniques may be used, and image data may be transmitted uncompressed if the communication speed is sufficient. The terminal communication module 28 is, for example, a Wi-Fi certified communication module, and may perform wireless communication at high speed with the terminal device 7 using a MIMO (Multiple Input Multiple Output) technique employed in the IEEE 802.11n standard, for example, or may use other communication schemes.

Furthermore, in addition to the image data, the computing device 3 also transmits sound data to the terminal device 7. Specifically, the input/output processor 11a outputs sound data generated by the DSP 11c to the terminal communication module 28 via the codec LSI 27. The codec LSI 27 performs a compression process on the sound data as it does on the image data. Any method can be employed for compressing the sound data, and such a method uses a high compression rate but causes less sound degradation. Also, in another example embodiment, the sound data may be transmitted without compression. The terminal communication module 28 transmits compressed image and sound data to the terminal device 7 via the antenna 29.

Furthermore, in addition to the image and sound data, the computing device 3 transmits various control data to the terminal device 7 where appropriate. The control data is data representing an instruction to control a component included in the terminal device 7, e.g., an instruction to control lighting of a marker section or an instruction to control shooting by a camera. The input/output processor 11a transmits the control data to the terminal device 7 in accordance with an instruction from the CPU 10. Note that in the present example embodiment, the codec LSI 27 does not perform a compression process on the control data, but in another example embodiment, a compression process may be performed. Note that the data to be transmitted from the computing device 3 to the terminal device 7 may or may not be coded depending on the situation.

Furthermore, the computing device 3 is capable of receiving various data from the terminal device 7. As will be described in detail later, in the present example embodiment, the terminal device 7 transmits operation data, image data, and sound data. The data transmitted by the terminal device 7 is received by the terminal communication module 28 via the antenna 29. Here, the image data and the sound data from the terminal device 7 have been subjected to the same compression process as performed on the image data and the sound data from the computing device 3 to the terminal device 7. Accordingly, the image data and the sound data are transferred from the terminal communication module 28 to the codec LSI 27, and subjected to a decompression process by the codec LSI 27 before output to the input/output processor 11a. On the other hand, the operation data from the terminal device 7 is smaller in size than the image data or the sound data and therefore is not always subjected to a compression process. Moreover, the operation data may or may not be coded depending on the situation. Accordingly, after being received by the terminal communication module 28, the operation data is outputted to the input/output processor 11a via the codec LSI 27. The input/output processor 11a stores the data received from the terminal device 7 (temporarily) in a buffer area of the internal main memory 11e or the external main memory 12.

Furthermore, the computing device 3 can be connected to other devices or external storage media. Specifically, the input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The computing device 3 includes a power button 24, a reset button 25, and an eject button 26. The power button 24 and the reset button 25 are connected to the system LSI 11. When the power button 24 is on, power is supplied from an external power source to the components of the computing device 3 via an AC adaptor (not shown). When the reset button 25 is pressed, the system LSI 11 restarts a boot (operating system) program of the computing device 3. The eject button 26 is connected to the disc drive 14. When the eject button 26 is pressed, the optical disc 4 is ejected from the disc drive 14.

In other example embodiments, some of the components of the computing device 3 may be provided as extension devices separate from the computing device 3. In this case, an extension device may be connected to the computing device 3 via the expansion connector 20, for example. Specifically, an extension device may include components as described above, e.g., a codec LSI 27, a terminal communication module 28, and an antenna 29, and can be attached to/detached from the expansion connector 20. Thus, by connecting the extension device to a computing device which does not include the above components, the computing device can communicate with the terminal device 7.

While the above description is directed to what are believed to be the most practical and preferred non-limiting embodiments, the invention is not to be limited to any detailed embodiments but rather is intended to cover various modifications and equivalent arrangements included within the spirit and scope of the claims.

What is claimed is:

1. A process for resetting a graphics processing unit of the type that generates a sequence of images using transformation and lighting, shading, texture mapping, and pixel processing, the process comprising:
   a. sending graphics commands from at least one computer processor to the graphics processing unit to control the graphics processing unit to generate the sequence of images;
   b. using the at least one computer processor, performing combination time and image sequence based testing comprising determining if (i) the graphics processing unit exceeds a threshold time to complete a task and (ii) the sequence of generated images falls behind;
   c. in response to the combination time and image sequence based testing, with the at least one computer processor conditionally resetting the graphics processing unit; and
   d. in response to the determining, the at least one computer processor automatically resetting the graphics processing unit.

2. The process of claim 1 wherein the at least one computer processor automatically resets the graphics processing unit in time to ready the graphics processing unit for processing a next image in the sequence.

3. The process of claim 1 wherein the graphics processing unit maintains an image frame count, and the time and image sequence based testing includes the at least one processor comparing the frame count the graphics processing unit maintains with an image frame count the at least one computer processor maintains.

4. The process of claim 1 wherein the at least one computer processor waits until a swap command before automatically resetting the graphics processing unit.

5. The process of claim 1 wherein the at least one computer processor waits until a vertical synchronization event before automatically resetting the graphics processing unit.

6. The process of claim 1 wherein the at least one computer processor waits until the end of an image display frame before automatically resetting the graphics processing unit.

7. The process of claim 1 wherein the time and image sequence based testing includes application-level testing to determine whether the graphics processing unit has faulted, and the at least one processor resets the graphics processing unit if the application-level testing determines the graphics processing unit has faulted.

8. The process of claim 1 wherein the time and image sequence based testing comprises the at least one processor performing the following Boolean logic:
   the graphics processing unit Status==HUNG
   OR
   Last flip time >C seconds ago AND the at least one processor frame count−the graphics processing unit frame count>a certain set threshold AND Last flip time !=0,
   wherein "Status==HUNG" determines if the status of the graphic processing unit is "HUNG", and "Last flip time >C seconds ago AND the at least one processor frame count−the graphics processing unit frame count>a certain set threshold AND Last flip time !=0" determines if a Last flip time occurred more than a predetermined set time C ago where C is in seconds, and the at least one processor frame count is greater than the graphics processing unit frame count by a certain set threshold AND the Las flip time is not equal to zero.

9. A system comprising:
   a graphics processing unit comprising transformation and lighting, shading, texture mapping, and pixel processing, the graphics processing unit configured to generate a sequence images;
   at least one watchdog processor operatively coupled to the graphics processing unit, the watchdog processor being configured to perform combination time and image sequence based testing comprising determining if (i) the graphics processing unit exceeds a threshold time to complete a task, and (ii) the sequence of generated images falls behind, and in response to the combination time and image sequence based testing, conditionally resetting the graphics processing unit to cure a graphics processing unit fault; and
   a reset circuit operatively coupled to the at least one watchdog processor, the reset circuit being configured to automatically reset the graphics processing unit in time to ready the graphics processing unit for generating a next image in the sequence of images.

10. The system of claim 9 wherein the graphics processing unit maintains a frame count, and the at least one watchdog processor determines whether the sequence of generated images falls behind by comparing the frame count the graphics processing unit maintains with a frame count the at least one watchdog processor maintains.

11. The system of claim 9 wherein the at least one watchdog processor waits until a swap command before automatically resetting the graphics processing unit.

12. The system of claim 9 wherein the at least one watchdog processor waits until a vertical synchronization event before automatically resetting the graphics processing unit.

13. The system of claim 9 wherein the at least one watchdog processor waits until the end of a display frame before automatically resetting the graphics processing unit.

14. The system of claim 9 wherein the at least one watchdog processor executes the combination time and image sequence based testing including application-level testing to determine whether the graphics processing unit faulted, and resets the graphics processing unit when the application-level testing determines the graphics processing unit has faulted.

15. The system of claim 9 wherein the watchdog processor performs the following Boolean logic:
   the graphics processing unit Status==HUNG
   OR
   Last flip time >C seconds ago AND the watchdog processor frame count−the graphics processing unit frame count>a certain set threshold AND Last flip time !=0,
   wherein "Status==HUNG" determines if the status of the graphics processing unit is "HUNG", and "Last flip time >C seconds ago AND the watchdog processor frame count−the graphics processing unit frame count>a certain set threshold AND Last flip time !=0" determines if a Last flip time occurred more than a predetermined set time C ago where C is in seconds, and the at least one processor frame count is greater than the graphics processing unit frame count by a certain set threshold AND the Last flip time is not equal to zero.

16. In a system including a graphics processing unit comprising transformation and lighting, shading, texture mapping, and pixel processing, the graphics processing unit configured to generate a sequence of images, a non-transitory storage device storing instructions comprising:
   first instructions that, when executed by a computer processor operatively coupled to the graphics processing unit, control the processor to perform combination time and image sequence based testing comprising determining if (i) the graphics processing unit exceeds a threshold time to complete a task, and (ii) the sequence of generated images falls behind;
   second instructions that, when executed by the computer processor in response to the time and image sequence based testing, cause the processor to conditionally reset the graphics processing unit to cure a fault; and third instructions that when executed by the computer processor cause the graphics processing unit to automatically reset in time to ready the graphics processing unit for generating a next image.

* * * * *